United States Patent
Chiu

(10) Patent No.: US 8,107,264 B2
(45) Date of Patent: Jan. 31, 2012

(54) SLOPE COMPENSATION METHOD AND CIRCUIT FOR A PEAK CURRENT CONTROL MODE POWER CONVERTER CIRCUIT

(75) Inventor: Jui-Yang Chiu, Taipei Hsien (TW)

(73) Assignee: ACBEL Polytech Inc., Taipei Hsien (TW)

( * ) Notice: Subject to any disclaimer, the term of this patent is extended or adjusted under 35 U.S.C. 154(b) by 694 days.

(21) Appl. No.: 12/250,976

(22) Filed: Oct. 14, 2008

(65) Prior Publication Data

US 2009/0134921 A1  May 28, 2009

(30) Foreign Application Priority Data

Nov. 22, 2007 (TW) .............................. 96144236 A

(51) Int. Cl.
*H02M 3/335* (2006.01)
(52) U.S. Cl. .................. 363/21.11; 363/70; 323/288
(58) Field of Classification Search ............... 363/21.04, 363/21.07, 21.08, 21.1, 21.11, 65, 69, 70, 363/71; 323/288
See application file for complete search history.

(56) References Cited

U.S. PATENT DOCUMENTS

| 6,208,538 B1 * | 3/2001 | Halamik et al. ............... 363/41 |
| 2009/0072808 A1 * | 3/2009 | Schlak ......................... 323/288 |
| 2009/0237059 A1 * | 9/2009 | Chiba ........................... 323/288 |

\* cited by examiner

*Primary Examiner* — Harry Behm
*Assistant Examiner* — Matthew Grubb
(74) *Attorney, Agent, or Firm* — Burr & Brown

(57) ABSTRACT

A slope compensation method and circuit for a peak current control mode power converter circuit is provided. Since the power converter circuit has a synchronous signal of a driven signal of enabling the first primary switch and the second primary switch, a triangular wave signal is generated. The driven signals of the first and second primary switches determine the ramp up time of the triangular wave signal. The triangular wave signal is added to one of the output DC voltage feedback signal of the corresponding power converter circuit that are used to compare with a current peak value of the voltage feedback signals. Therefore, a high level triangular wave DC voltage feedback signal that is higher than the DC voltage feedback signal is formed, and the switching noises do not effect comparing result of a PWM controller of the power converter circuit.

27 Claims, 15 Drawing Sheets

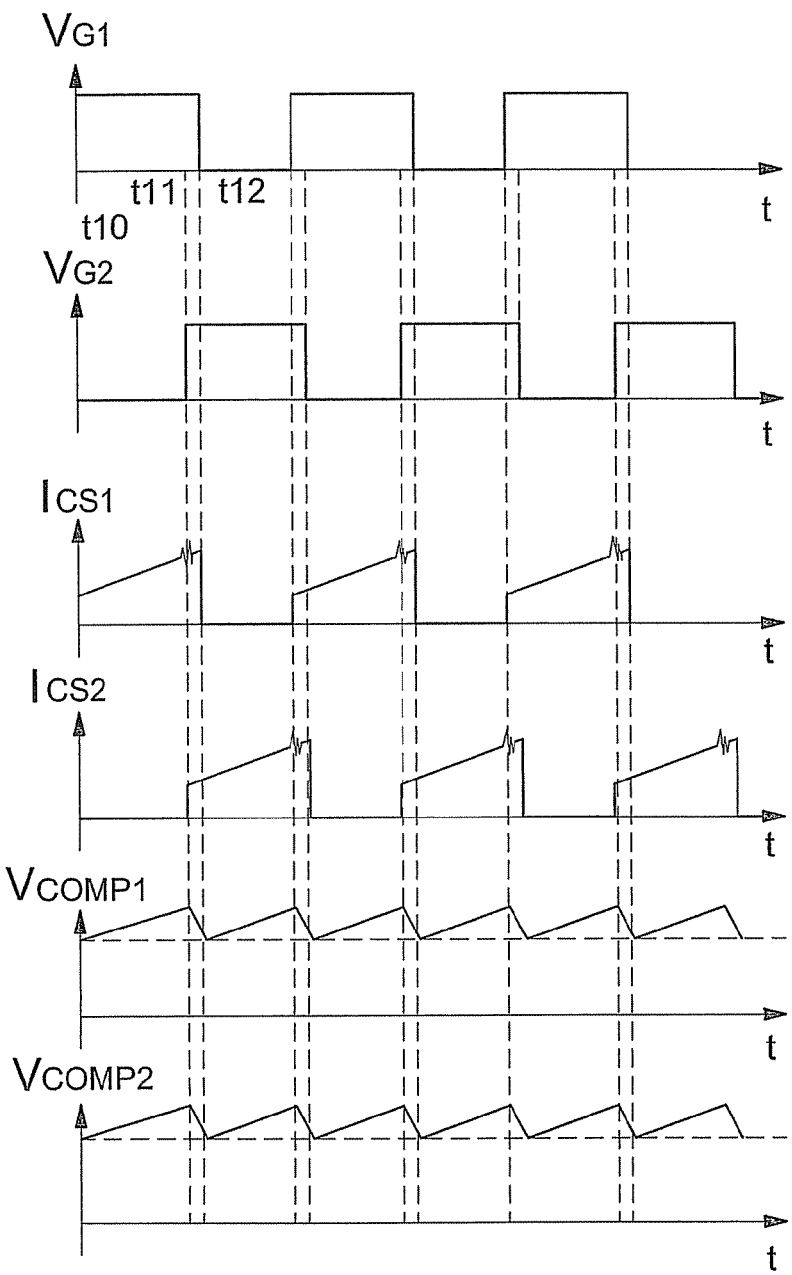

US 8,107,264 B2

SLOPE COMPENSATION METHOD AND CIRCUIT FOR A PEAK CURRENT CONTROL MODE POWER CONVERTER CIRCUIT

BACKGROUND OF THE INVENTION

1. Field of the Invention

The present invention is related to a peak current mode control power converter circuit, and more particularly a slope compensation method and circuit used to the peak current control mode power converter circuit that restrains switching noises when the peak current control mode power converter circuit is operating.

2. Description of the Related Art

A conventional DC (direct current) to DC power converter converts a DC power source into one or multiple DC power sources of different voltages, so as to output the DC power sources to corresponding circuit units on a circuit board or corresponding electronic devices.

The DC to DC power converter has different control methods. One controlled method is a peak current. The peak current control mode power converter circuit has an advantage of simplified circuits, but has a drawback of poor noise control ability. With reference to FIG. 8, a conventional DC to DC converter circuit 50 with a peak current controlled mode has a first forward converter 51, a second forward converter 52, and a pulse width modulation (PWM) controller 53.

The first forward converter 51 and the second forward converter 52 have at least two sets of high frequency transformers T3 and T4 and two primary switches Q1 and Q2. Primary sides of the high frequency transformers T3 and T4 are coupled to the corresponding primary switches Q1 and Q2. The primary switches Q1 and Q2 are open or closed to determine whether the primary sides generate currents or not. On the other hand, secondary sides of the high frequency transformers T3 and T4 are output terminals of the DC to DC converter circuit 50 with the peak current.

The PWM controller 53 has a first PWM output terminal OUT1 and a second PWM output terminal OUT2, a first output voltage feedback terminal COMP1 and a second output voltage feedback terminal COMP2, and a first current feedback input terminal CS1 and a second current feedback input terminal CS2. The two PWM output terminals OUT1 and OUT2 are coupled to control terminals of the primary switches Q1 and Q2 of the first forward converter 51 and the second forward converter 52.

The two output voltage feedback terminals COMP1 and COMP2 are coupled to corresponding DC output terminals of the first forward converter 51 and the second forward converter 52, so as to acquire two corresponding voltage feedback signals $V_{error1}$ and $V_{error2}$ of the two DC output terminals. Moreover, the current feedback input terminals CS1 and CS2 acquire current feedback signals of the primary sides of the corresponding high frequency transformers T3 and T4.

The DC to DC converter circuit 50 modulates a pulse width of each output signal by a peak current mode control method. With further reference to FIG. 9, when the two primary switches Q1 and Q2 are alternatively driven by a pulse width signal of 50% duty cycle, an optimal waveform of current feedback signals of measured currents of the two current feedback input terminals CS1 and CS2 is shown. When the first primary switch Q1 is conductive for a 50% duty cycle time period, a corresponding voltage value $V_{CS1}$ of a feedback current is larger than a voltage value $V_{COMP1}$ of a first voltage feedback signal at an input terminal COMP1.

At this moment, the PWM controller 53 turns off the first primary switch Q1 and also simultaneously controls the second primary switch Q2 to be conductive. With the same manner, when the second primary switch Q2 is conductive for a 50% duty cycle time period, the PWM controller 53 compares a corresponding voltage value $V_{CS2}$ of the second current feedback input terminal CS2 with a target value $V_{COMP2}$ of a second voltage feedback signal at an input terminal COMP2. When the corresponding voltage value $V_{CS2}$ of a feedback current is larger than the voltage value $V_{COMP2}$ of the second voltage feedback signal, the PWM controller 53 turns off the second primary switch Q2 and also simultaneously controls the first primary switch Q1.

Therefore, the PWM controller 53 detects the corresponding voltage values Vcs1 and Vcs2 at the first and second current feedback input terminal CS1 and CS2 in accordance with the current of the primary sides of the high frequency transformers T3 and T4, and then to compare with the voltage values Vcomp1 and Vcomp2 of the voltage feedback signals at the two input terminal COMP1 and COMP2 respectively coupled to the secondary sides of the high frequency transformers T3 and T4. Once the voltage peak value of the voltage value Vcs1 or the voltage value Vcs2 is larger than the feedback voltage value, the PWM controller 53 alternatively changes on and off statuses of the two primary switches Q1 and Q2.

However, when the two primary switches Q1 and Q2 are respectively driven by a pulse width signal of larger than 50% duty cycle, the peak current control mode method is inferior to the aforesaid example. With further reference to FIG. 10, the two primary switches Q1 and Q2 are alternatively driven by a pulse width signal of 55% duty cycle as a target value. When only the first primary switch Q1 is driven to be conductive at $t_{10}$, the primary switch Q1 should be turned off when a time point $t_{12}$ reaches the target value in theory. However, a time point $t_{20}$ is ahead of the time point of $t_{12}$ of the target value, so that the second 9 primary switch Q2 is conductive. Since the second primary switch Q2 is driven to be conductive at the time point $t_{20}$, a current waveform of the first current feedback input terminal CS1 produces a surge at a time point $t_{11}$.

The surge makes the PWM controller 53 determine that a corresponding voltage peak value $V_{CS1}$ of a first current feedback signal is larger than a voltage value $V_{COMP1}$ of a secondary side feedback voltage signal. Hence the primary switch Q1 is turned off at a time point $t_{11}$. The optimal waveform is shown as a marked dotted line, and the primary switch Q1 is turned off earlier before the target value reaches. With further reference to FIG. 11, an output DC power of the first high frequency transformer T3 and the second high frequency transformer T4 can not avoid generating oscillation.

Similarly, when the second primary switch Q2 is conductive for 55% duty cycle $t_{20}$ to $t_{211}$, the primary switch Q1 is driven to be conductive again by the PWM controller 53 at a time point $t_{13}$. At the time point $t_{13}$ the coupling effect is generated, so as to influence the primary side current of the second conductive high frequency transformer T4 to produce a surge. Hence a corresponding voltage peak value $V_{CS2}$ of a second current feedback signal is larger than a voltage value $V_{COMP2}$ of a second voltage feedback signal at a time point $t_{21}$ before the time point $t_{211}$ of the target value, so as to turn off the second primary switch Q2. In comparison with the optimal waveform as the dotted line, the second primary switch Q2 is turned off earlier. Nevertheless, the DC power oscillation is still generated.

Therefore, it can be clearly understood that when the PWM signals of the two primary switches Q1 and Q2 are larger than 50% duty cycle, operation periods of the first forward converter 51 and the second forward converter 52 become overlapped. At this moment, the turned off primary switch generates a noise and the noise is coupling to the other current waveform, so as to influence the peak current and further result in an output oscillation phenomenon. Thereby the conventional DC to DC converter has to be further improved to provide more stable DC power supply.

SUMMARY OF THE INVENTION

An objective of the present invention is to provide a slope compensation circuit for a peak current control mode power converter circuit. The peak current control mode power converter circuit has a first forward converter, a second forward converter and a pulse width modulation (PWM) controller for controlling the first forward converter and the second forward converter. The first forward converter and the second forward converter respectively have a first high frequency transformer and a second high frequency transformer and a first primary switch and a second primary switch that are serial connected to a primary side of the first high frequency transformer and the second high frequency transformer. The slope compensation circuit has a first charging circuit, a second charging circuit and a discharging circuit.

The first charging circuit has two resistors to be serial connected to form a first serial connected resistor and a capacitor. Two terminals of the first serial connected resistor are respectively coupled to a first terminal of the capacitor and a first DC power source. A second terminal of the capacitor is coupled to multiple output voltage feedback terminals of the PWM controller.

The second charging circuit has two resistors to be serial connected to form a second serial connected resistor. The second serial connected resistor is parallel connected to the first serial connected resistor.

The discharging circuit has a third electronic switch and a fourth electronic switch respectively coupled to multiple corresponding serial connection nodes of the first serial connected resistor and the second serial connected resistor. A control terminal of the third electronic switch is coupled to a control terminal of the first primary switch of the first forward converter. A control terminal of the fourth electronic switch is coupled to the control terminal of the second primary switch of the second forward converter. In this way, the third electronic switch and the fourth electronic switch are simultaneously turned on or off with the first primary switch and the second primary switch.

BRIEF DESCRIPTION OF THE DRAWINGS

FIG. 2A to FIG. 2C show equivalent circuit diagrams of a first preferred embodiment of a slope compensation circuit in accordance with the present invention;

FIGS. 3A to 3F show multiple voltage to current waveform diagrams of input and output terminals of a pulse width modulation (PWM) controller in accordance with the present invention;

DETAILED DESCRIPTION OF THE INVENTION

Figure 1A:
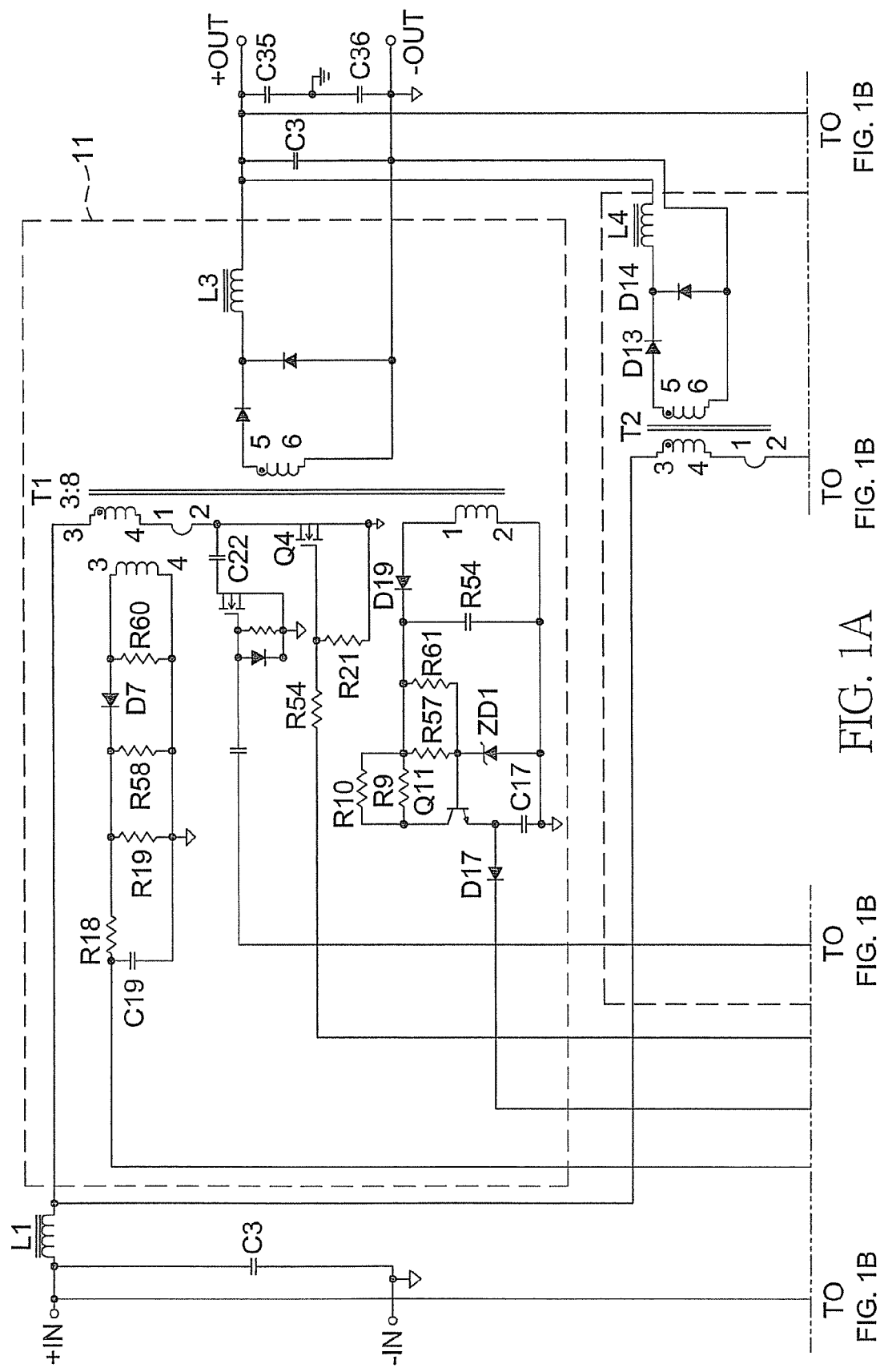
FIGS. 1A and 2B are a detailed circuit diagram of a slope compensation circuit for a peak current control mode power converter circuit in accordance with the present invention.
Figure 1B:
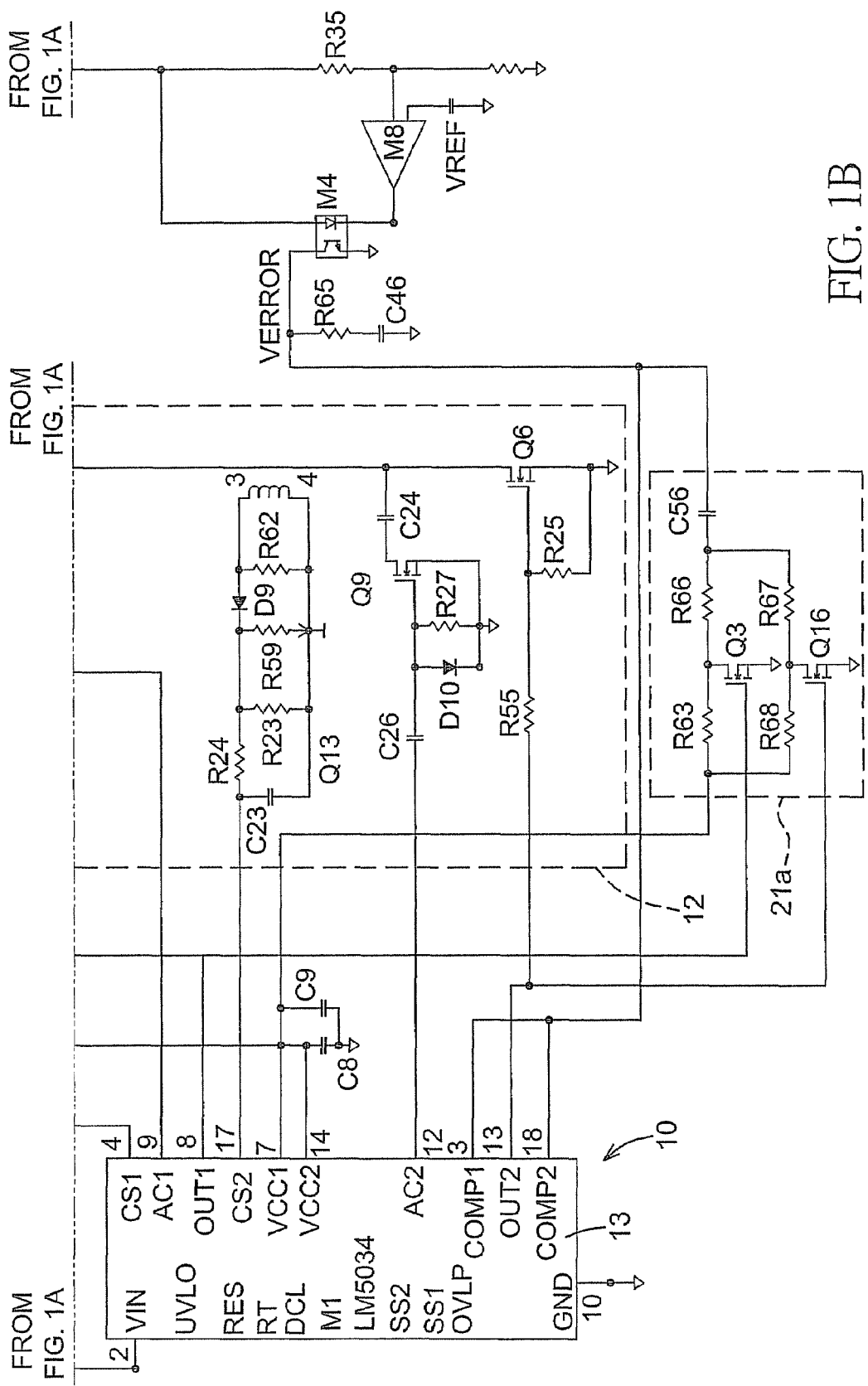

With reference to FIGS. 1A and 1B, a first preferred embodiment in accordance with the present invention of a slope compensation circuit 21a for a peak current control mode power converter circuit 10 is shown. In order to effectively avoid using high efficient and large sized transformers, the peak current control mode power converter circuit 10 has parallel connected outputs of a first forward converter 11 and a second forward converter 12, so as to provide only one output direct current (DC) power supply OUT. The first forward converter 11 and the second forward converter 12 are controlled by a pulse width modulation (PWM) controller 13.

The first forward converter 11 and the second forward converter 12 respectively have a first high frequency transformer T1 and a second high frequency transformer T2 and a first primary switch Q4 and a second primary switch Q6. Primary sides of the first high frequency transformer T1 and the second high frequency transformer T2 are coupled to an input DC power supply. The first primary switch Q4 and the second primary switch Q6 are respectively serial connected to the primary sides of the first high frequency transformer T1 and the second high frequency transformer T2. The first primary switch Q4 and the second primary switch Q6 are turned on or off to determine whether the first high frequency transformer T1 or the second high frequency transformer T2 are conductive.

The PWM controller 13 has a first PWM output terminal OUT1 and a second PWM output terminal OUT2, a first output voltage feedback terminal COMP1 and a second output voltage feedback terminal COMP2, and a first current feedback input terminal CS1 and a second current feedback input terminal CS2. The two PWM output terminals OUT1 and OUT2 are respectively coupled to control terminals of the first primary switch Q4 and the second primary switch Q6 of the first forward converter 11 and the second forward converter 12.

The two output voltage feedback terminals COMP1 and COMP2 are respectively coupled to corresponding DC output terminals of the first forward converter 11 and the second forward converter 12, so as to acquire two output voltage feedback signals. Moreover, the current feedback input terminals CS1 and CS2 respectively acquire conductive current signals of the primary sides of the first high frequency transformer T1 and the second high frequency transformer T2.

The slope compensation circuit 21a is coupled to one DC voltage output of the peak current control mode power converter circuit 10 and the two output voltage feedback terminals COMP1 and COMP2 of the PWM controller 13. In this way, a high level triangular wave DC voltage feedback signal and the original DC voltage feedback signal are simultaneously inputted to the two output voltage feedback terminals COMP1 and COMP2 of the PWM controller 13.

Figure 2A:
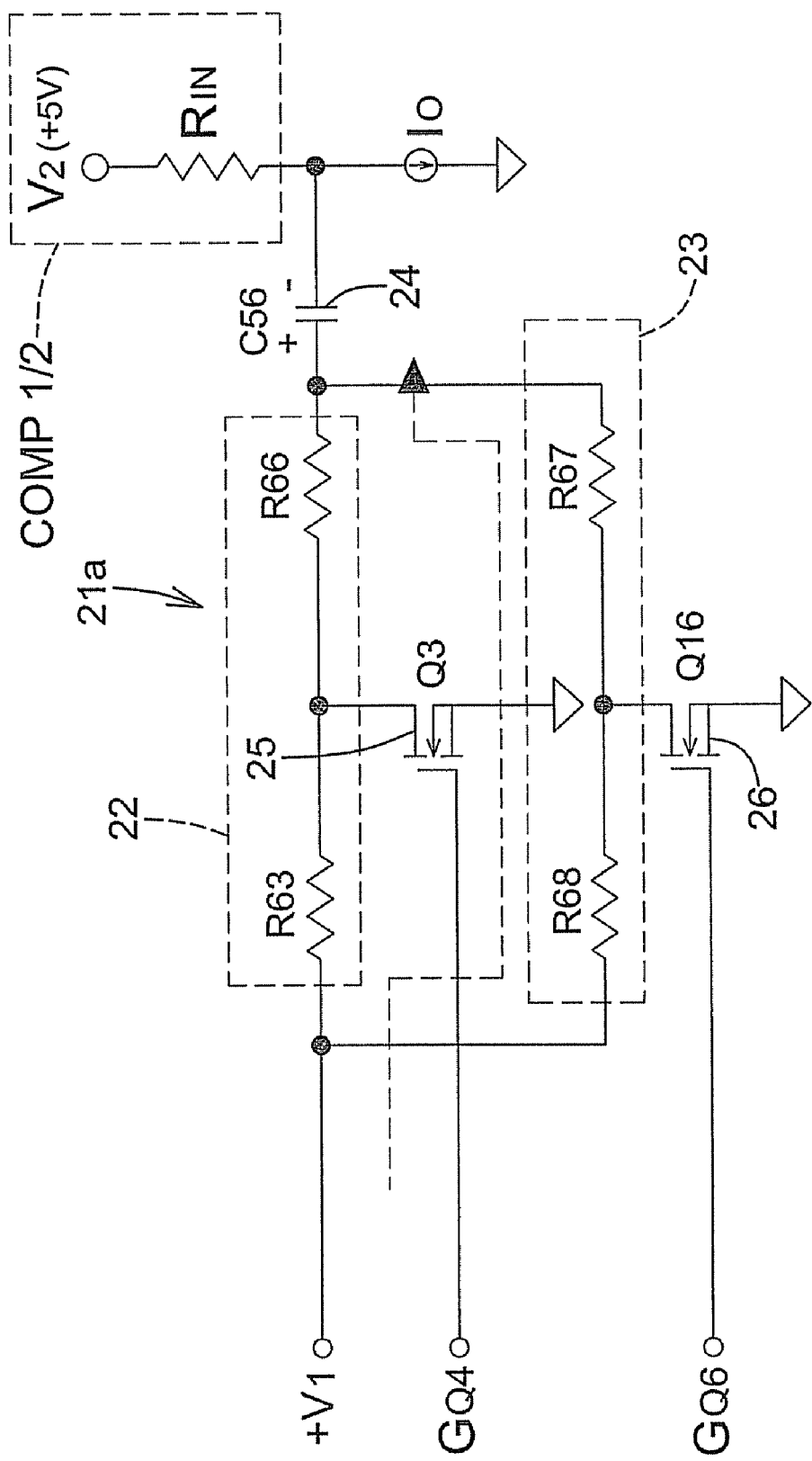
Figure 2B:
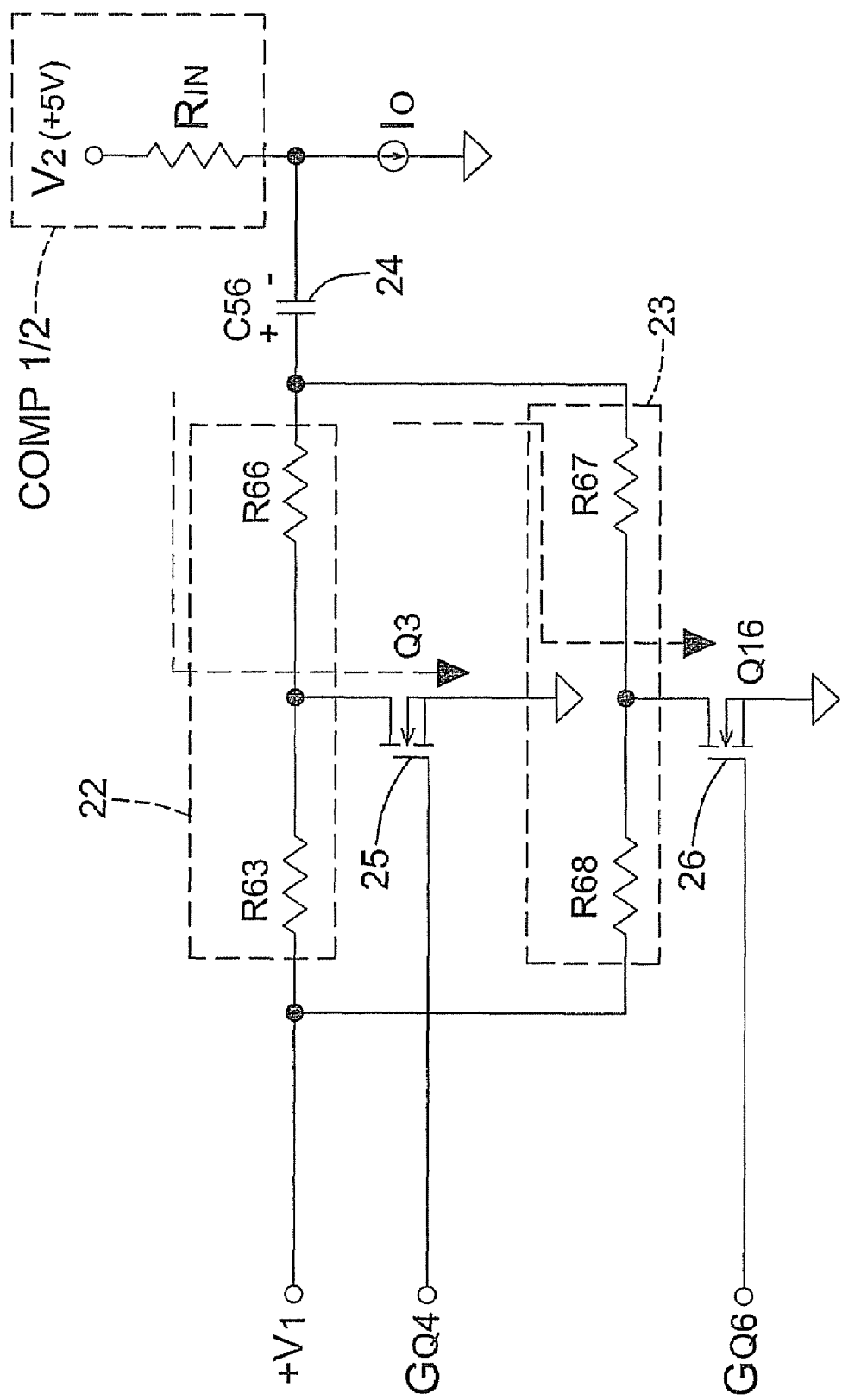
Figure 2C:
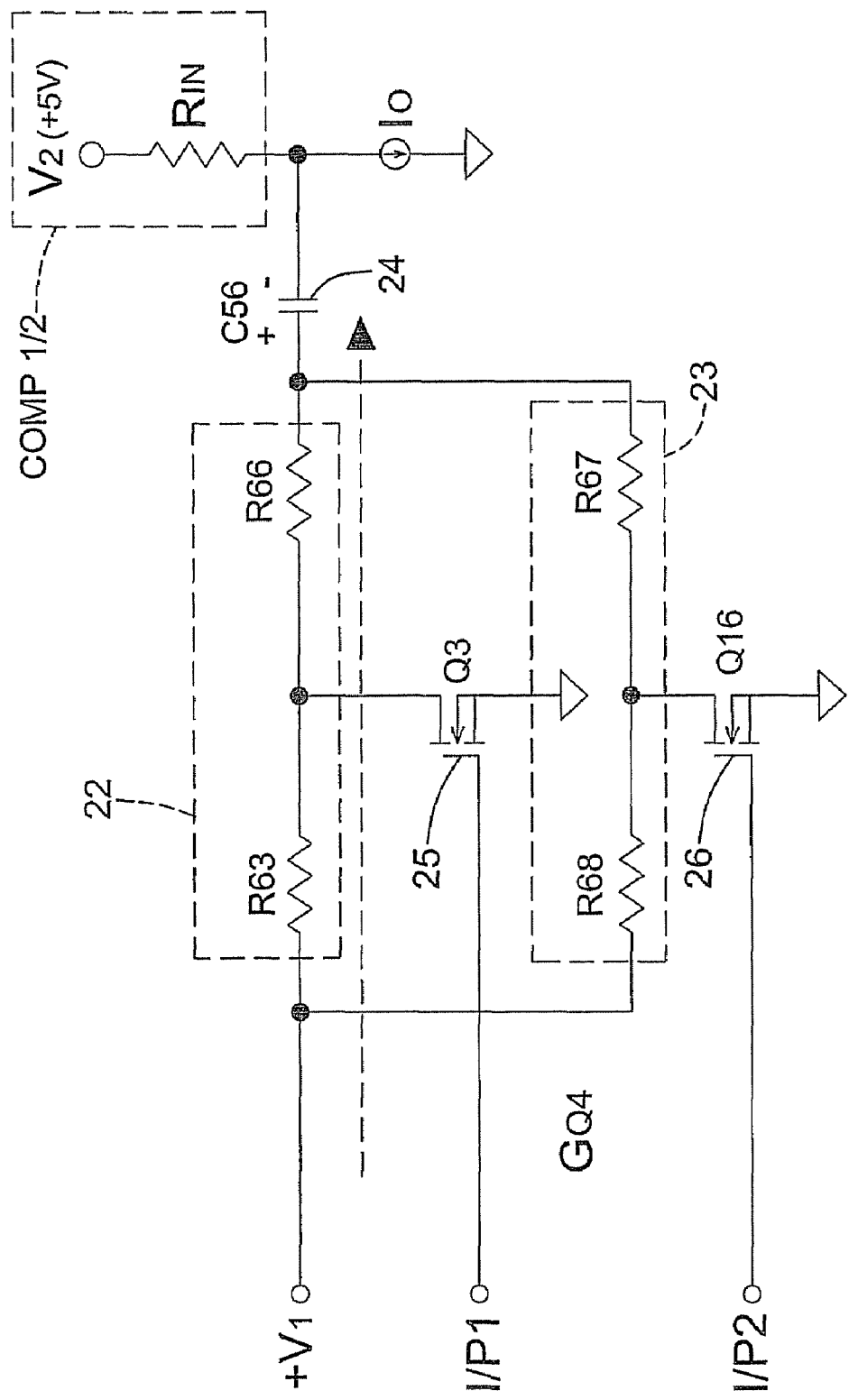

With reference to FIG. 2C, the first preferred embodiment of the slope compensation circuit 21a has a first charging circuit, a second charging circuit and a discharging circuit.

The first charging circuit has two resistors R63 and R66 and a capacitor 24. The two resistors R63 and R66 are serial connected forming a first serial connected resistor 22. Two terminals of the first serial connected resistor 22 are respectively coupled to a first terminal of the capacitor 24 and a first DC power source +V1. A second terminal of the capacitor 24 is coupled to the output voltage feedback terminals COMP1 and COMP2 of the PWM controller 13.

The second charging circuit has two resistors R68 and R67 serial connected forming a second serial connected resistor 23. The second serial connected resistor 23 is parallel connected to the first serial connected resistor 22.

The discharging circuit has a third electronic switch 25 and a fourth electronic switch 26. The third electronic switch 25 and the fourth electronic switch 26 are respectively coupled to corresponding serial connection nodes of the first serial connected resistor 22 and the second serial connected resistor 23. A control terminal of the third electronic switch 25 is coupled to the control terminal of the first primary switch Q4 of the first forward converter 11. A control terminal of the fourth electronic switch 26 is coupled to the control terminal of the second primary switch Q6 of the second forward converter 12. In this way, the third electronic switch 25 and the fourth electronic switch 26 are simultaneously turned on or off with the first primary switch Q4 and the second primary switch Q6.

The following description explains the first preferred embodiment of generating the high level triangular wave DC voltage feedback signal of the slope compensation circuit 21a of a triangular wave generator.

With reference to FIG. 1, FIG. 2A, FIG. 2B and FIG. 2C, the output terminal of the slope compensation circuit 21a is coupled to the output voltage feedback terminals COMP1 and COMP2 of the PWM controller 13. The output voltage feedback terminals COMP1 and COMP2 are coupled to a second DC power source V2 via an internal resistor $R_{IN}$. A voltage of the second DC power source V2 is lower than the voltage of the first DC power source V1. Equivalent circuit diagrams are shown in FIG. 2A to FIG. 2C. An assumption in this preferred embodiment is to make a phototransistor of an optical coupler M4 as an electric current source $I_O$.

With reference to FIGS. 3A to 3F, when the PWM controller 13 outputs a pulse width signal to the first primary switch Q4 during a time period $t_{10}$ to $t_{12}$, the first primary switch Q4 is conductive. At this moment, the first high frequency transformer T1 is inducted to have a conductive current via a first current transformer T3. At this moment, the third electronic switch 25 is also conductive. The second primary switch Q6 and the fourth electronic switch 26 are in an off status. Since the first DC power source V1 is higher than the second DC power source V2 and also the third electronic switch 25 makes the serial connection nodes of the first charging circuit short, the first DC power source V1 charges the capacitor 24 via the second charging circuit and also $V_{COMP1}$ and $V_{COMP2}$ ramp up as shown in FIGS. 3E and 3F.

Figure 4A:
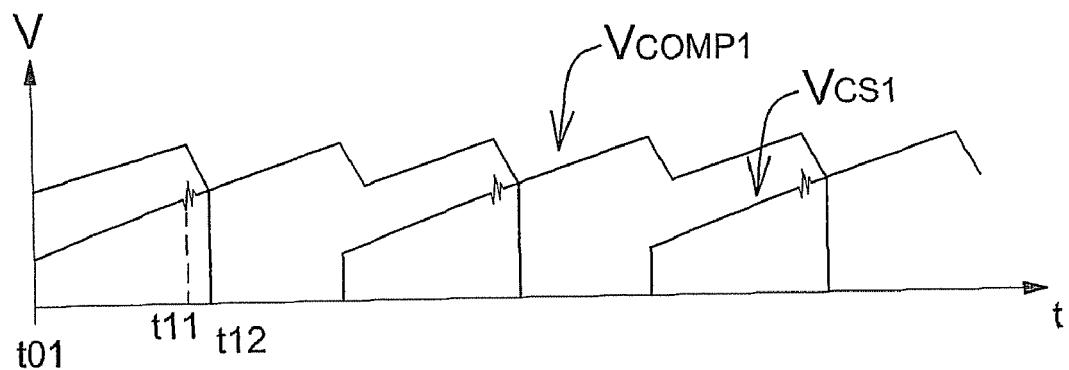
FIGS. 4A and 4B show two voltage waveform diagrams of the high level triangular wave DC voltage feedback signals $V_{COMP1}$ and $V_{COMP2}$ encounter corresponding voltage peak value $V_{CS1}$ and $V_{CS2}$ of the first high frequency transformer and the second high frequency transformer in accordance with the present invention.

With reference to FIG. 2B, when the PWM controller 13 controls the second primary switch Q6 to be conductive during a time period $t_{11}$ to $t_{12}$, the third electronic switch 25 and the fourth electronic switch 26 are simultaneously conductive. At this moment, the fully charged capacitor 24 starts to discharge to the ground via the third electronic switch 25 and the fourth electronic switch 26 and also $V_{COMP1}$ and $V_{COMP2}$ drop down. With reference to FIG. 4A, when the capacitor 24 discharges for a period of time, the $V_{COMP1}$ encounters a corresponding voltage peak value $V_{CS1}$ of the first current feedback signal of the first high frequency transformer T1. At this moment, the PWM controller 13 immediately controls the first primary switch Q4 and the third electronic switch 25 to be tuned off. With reference to FIG. 2C and FIGS. 3A to 3F, the PWM controller 13 only continues to control the second primary switch Q6 and the fourth electronic switch 26 to be conductive at this moment and also the capacitor 24 charges via the first charging circuit. The PWM controller 13 then further controls the first primary switch Q4 and the third electronic switch 25 to be conductive, so that the capacitor 24 starts to discharge. And then the triangular wave DC voltage feedback signals, which are $V_{COMP1}$ and $V_{COMP2}$, drop down. When the corresponding voltage peak value $V_{CS2}$ of the second current feedback signal of the second high frequency transformer T2 is encountered, the PWM controller 13 controls the second primary switch Q6 and the fourth electronic switch 26 to be turned off, so as to operate in a cycle.

Figure 4B:
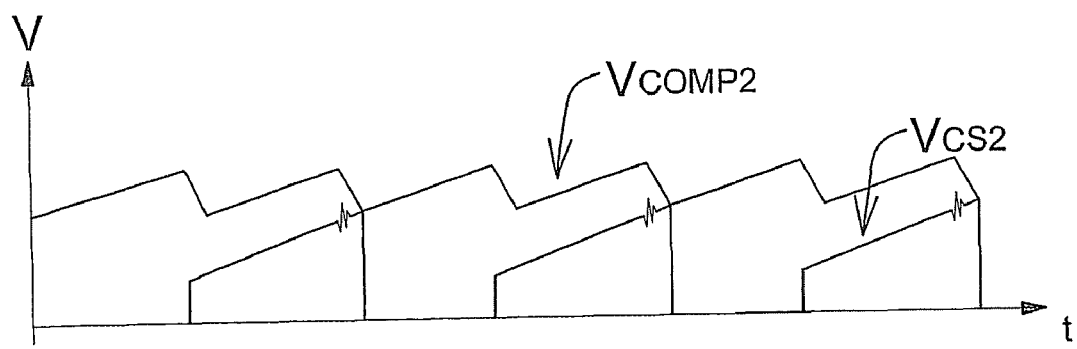

With reference to FIG. 4A and FIG. 4B, the slope compensation circuit 21a of the present invention indeed compensates a slope of the output DC voltage of the power converter circuit to make the original output voltage feedback signal compensate as the high level triangular wave DC voltage feedback signals $V_{COMP1}$ and $V_{COMP2}$. In this way, the conventional voltage surge that would turn off the first primary switch Q4 and the second primary switch Q6 ahead of the pre-determined time produced by the conductive high frequency transformer can be avoided. Hence the first primary switch Q4 and the second primary switch Q6 can be turned off on time when the time point $t_{12}$ of the target value reaches.

A raised slop and a dropped slop of the high level triangular wave DC voltage feedback signals can be changed along with a resistor value and a capacitor value of the first charging circuit and the second charging circuit. In this preferred embodiment, the resistor R63 is equal to the resistor R68 and the resistor R66 is equal to the resistor R67 to make the two current circuits have the same charge and discharge property.

Figure 5:
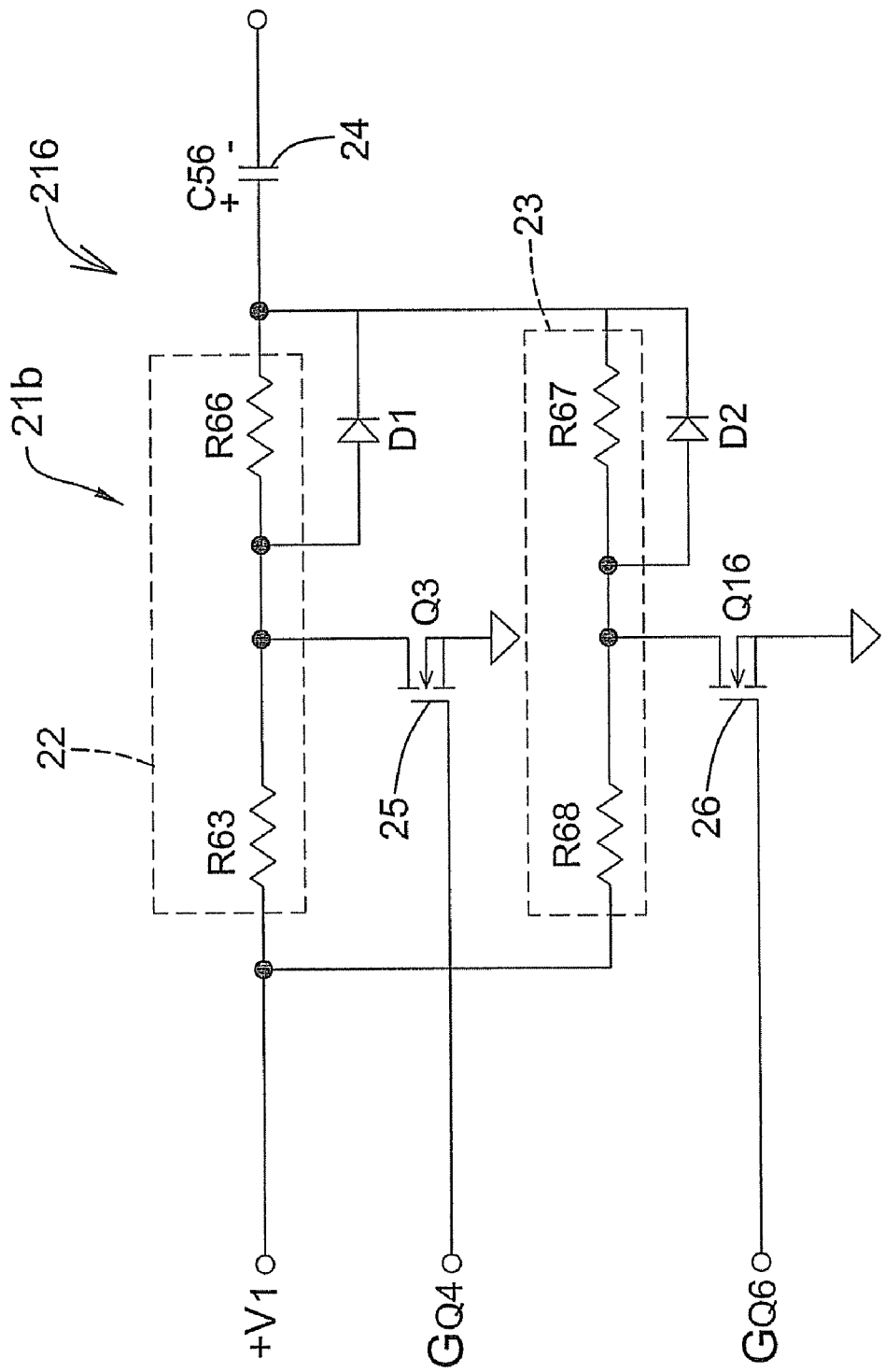
FIG. 5 is a second preferred embodiment of a triangular wave generator in accordance with the present invention.

With reference to FIG. 5, a second preferred embodiment of the slope compensation circuit 21b of the present invention is similar to the first preferred embodiment. The only difference is that the first serial connected resistor R66 and the second serial connected resistor R67 coupled to the capacitor 24 are respectively parallel connected to a first diode D1 and a second diode D2 to adjust RC charge and discharge time.

Figure 6:
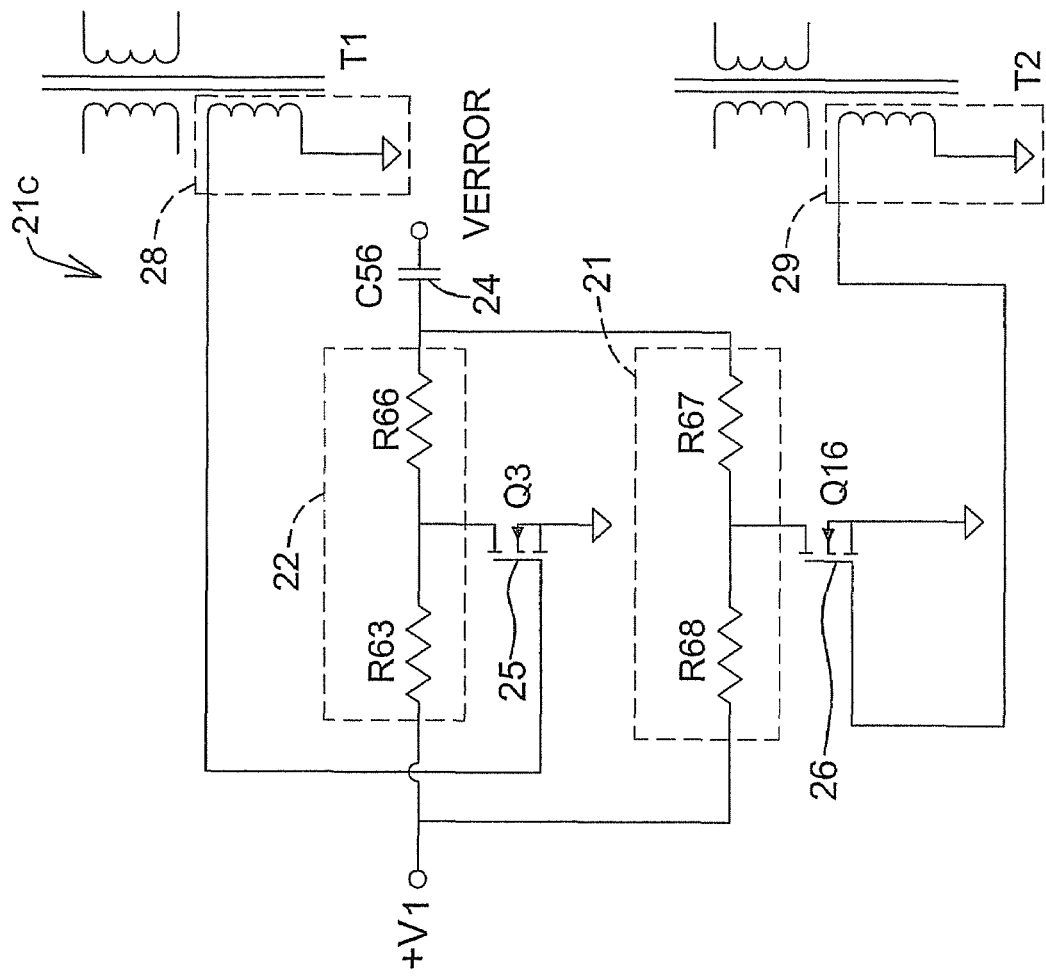
FIG. 6 is a third preferred embodiment of a triangular wave generator in accordance with the present invention.

With reference to FIG. 6, a third preferred embodiment of the slope compensation circuit 21c in accordance with the present invention is similar to the first preferred embodiment. In this preferred embodiment, the control terminals of the third electronic switch 25 and the fourth electronic switch 26 are coupled to the primary sides of the first high frequency transformer T1 and the second high frequency transformer T2 via a first current transformer 28 and a second current transformer 29 that are respectively coupled to the primary sides of the high frequency transformers T1 and T2, so as to acquire conductive current signals of the primary sides of the high frequency transformers T1 and T2. The conductive current signals are synchronous as driven signals of enabling the first primary switch Q4 and the second primary switch Q6, so as to be a basis of disabling the third electronic switch 25 and the fourth electronic switch 26.

Figure 7A:
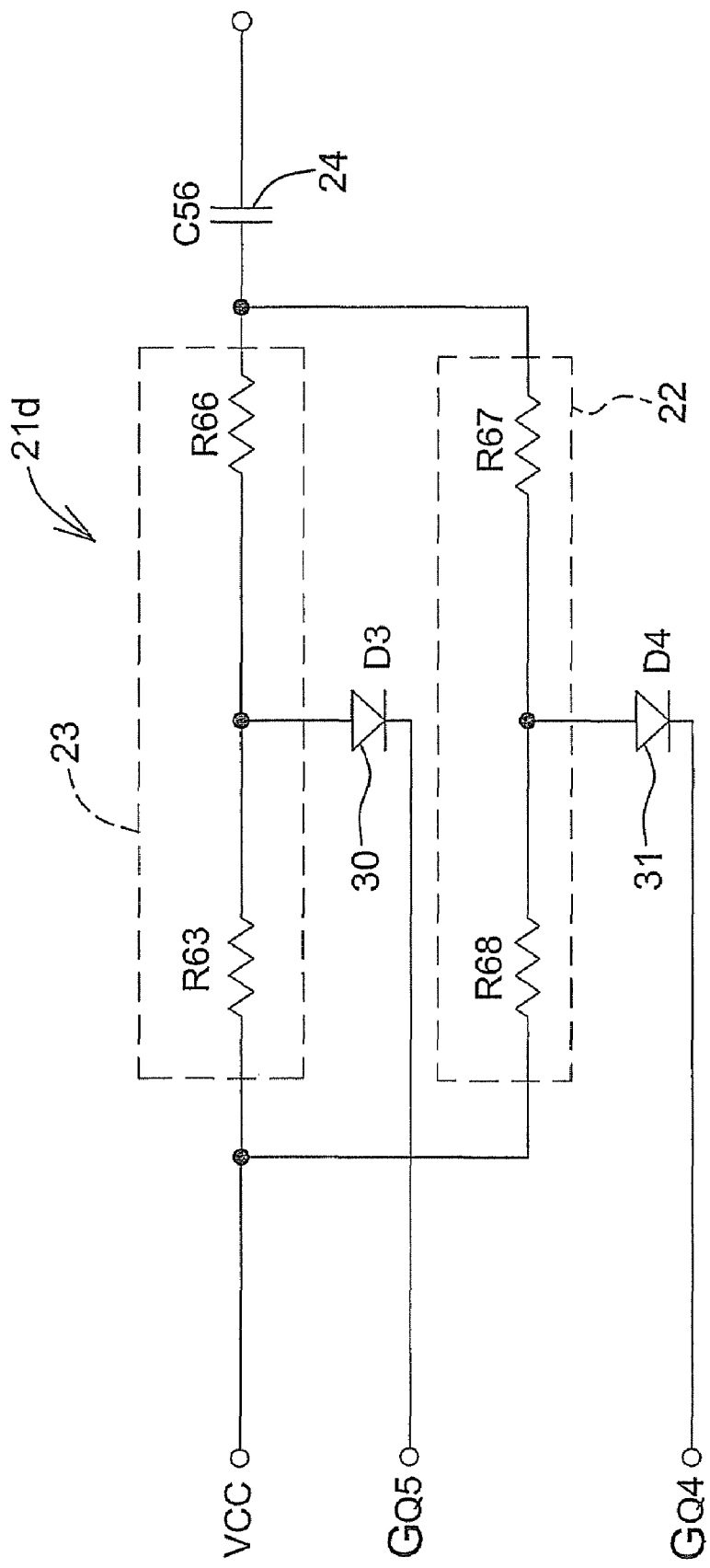
FIG. 7A is a fourth preferred embodiment of a triangular wave generator in accordance with the present invention.

With reference to FIG. 7A, a fourth preferred embodiment of the slope compensation circuit 21d of the present invention is similar to the first preferred embodiment. The only difference is that the third electronic switch 25 and the fourth electronic switch 26 are replaced by a first diode 30 and a second diode 31. A positive electrode of the first diode 30 is coupled to the serial connection node of the second serial connected resistor 23 of the second charging circuit and a negative electrode of the first diode 30 is coupled to the control terminal of the second primary switch Q6. Similarly, a positive electrode of the second diode 31 is coupled to the serial connection node of the first serial connected resistor 22 of the first charging circuit and a negative electrode of the second diode 31 is coupled to the control terminal of the first primary switch Q4.

Figure 7B:
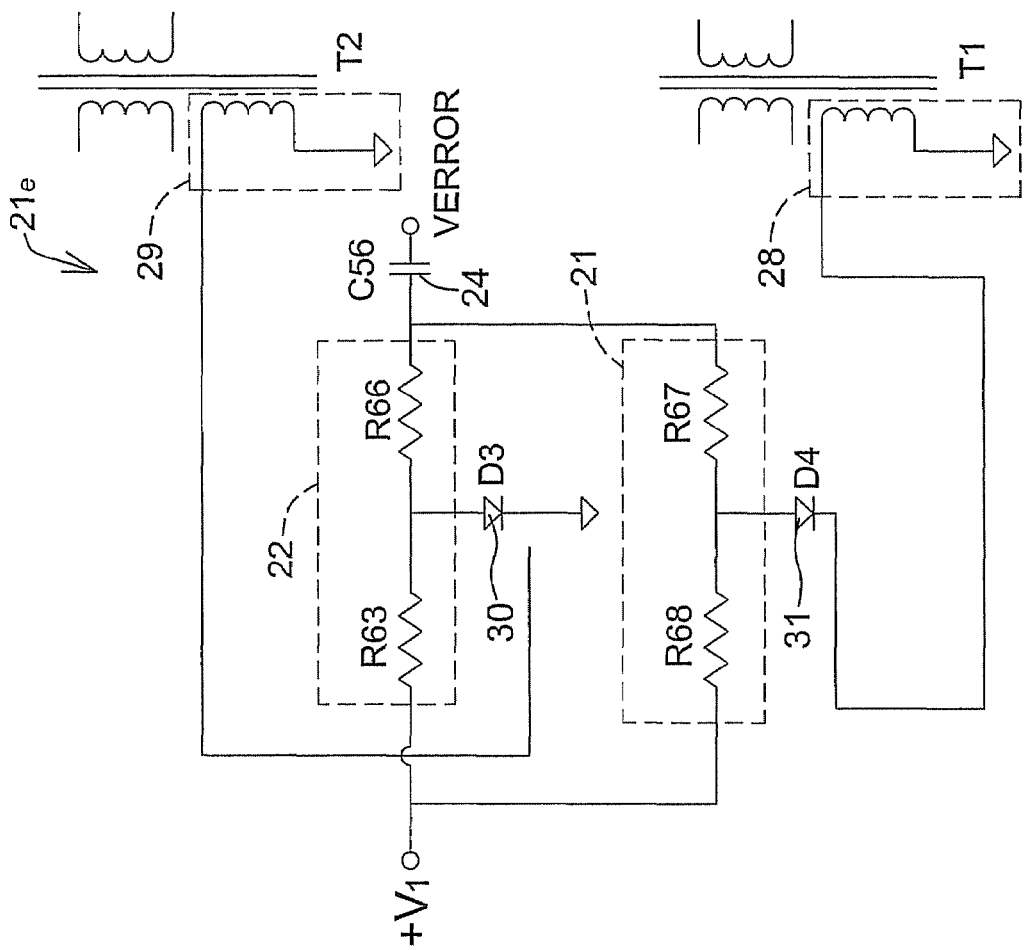
FIG. 7B is a fifth preferred embodiment of a triangular wave generator in accordance with the present invention.
Figure 8:
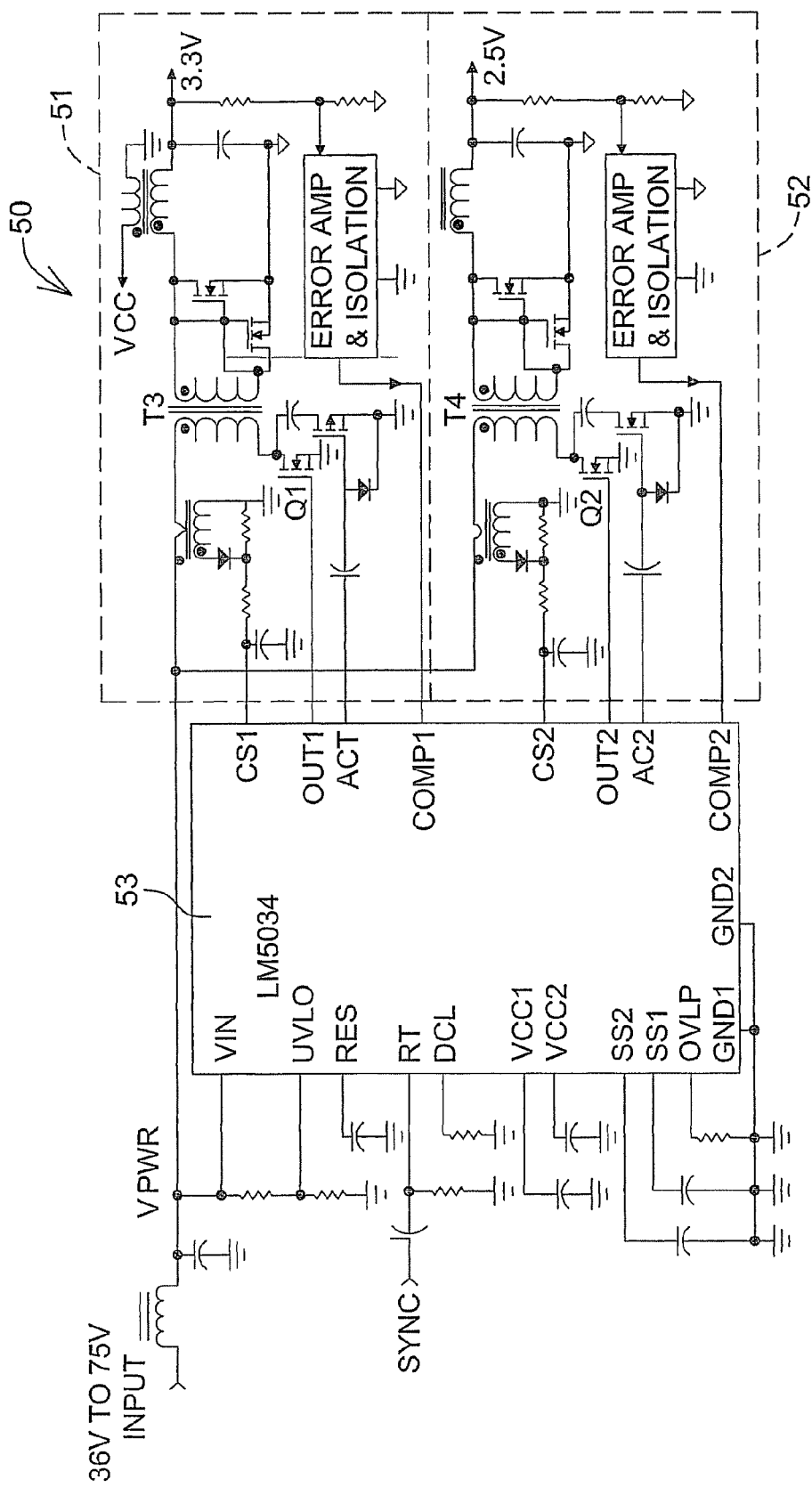
FIG. 8 is a circuit diagram of the conventional peak current control mode power converter circuit in accordance with the prior art.
Figure 9:
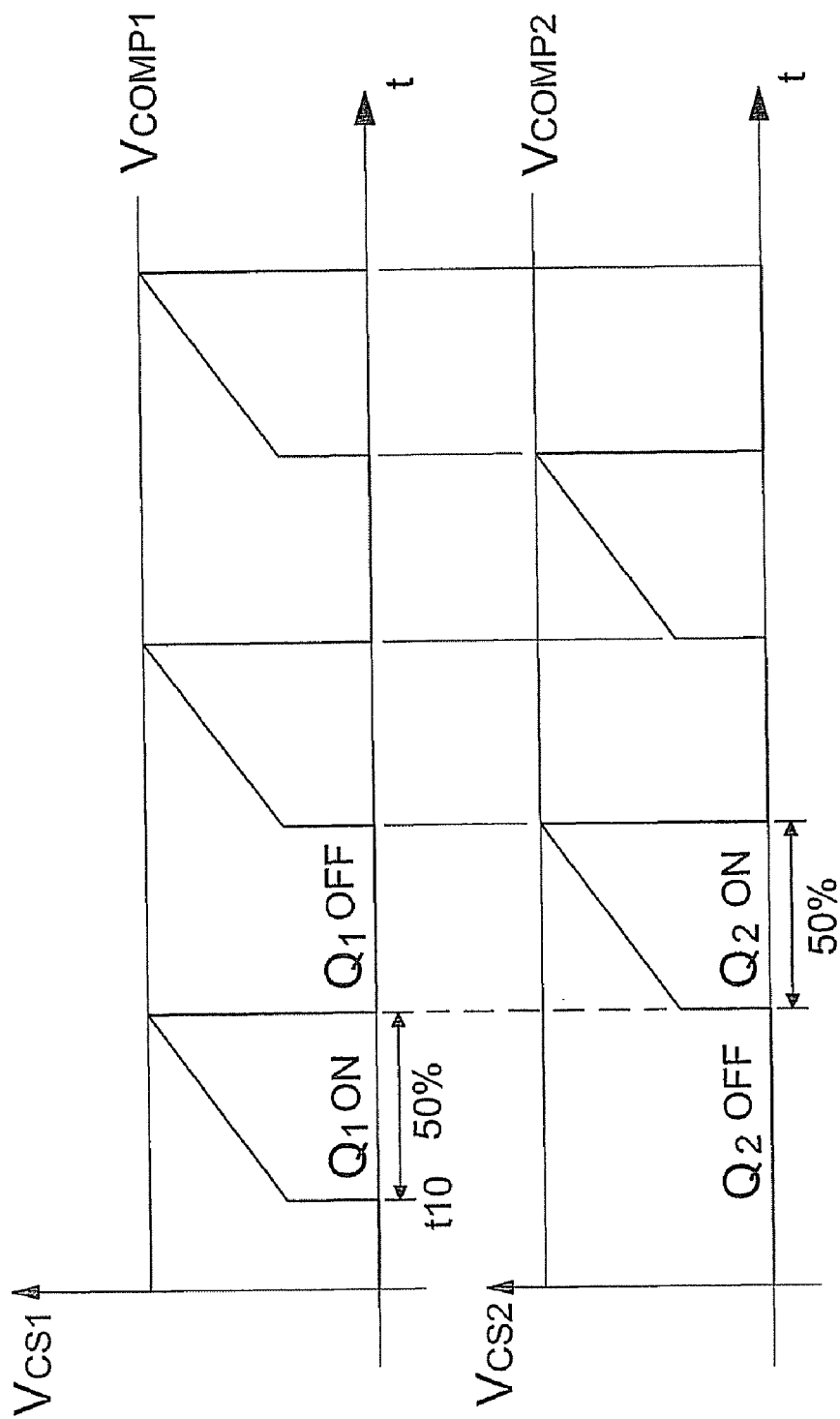
FIG. 9 is a current waveform diagram of current feedback signals of two current feedback input terminals when two primary switches Q1 and Q2 are driven by a pulse width signal of 50% duty cycle in accordance with the prior art.
Figure 10:
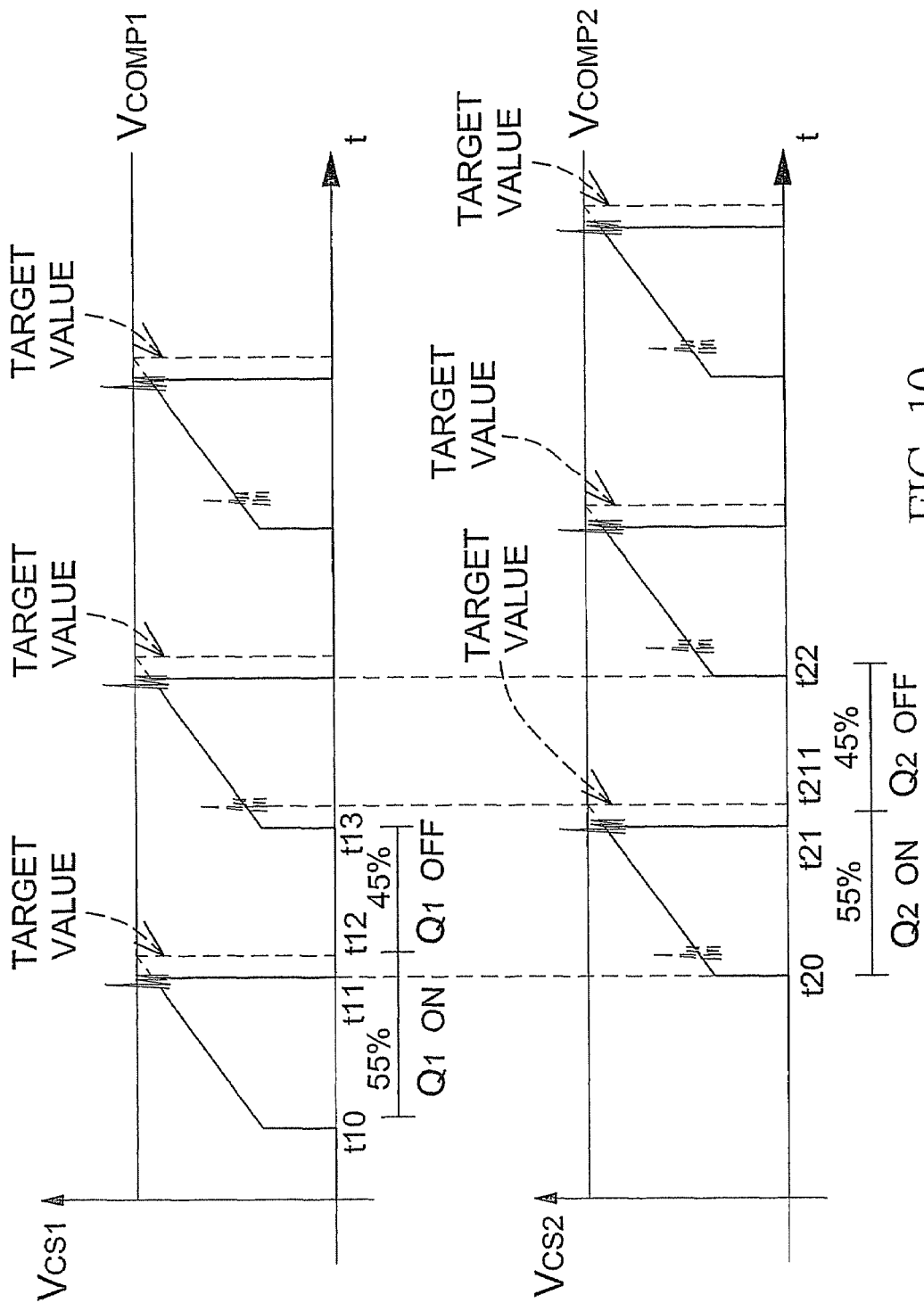
FIG. 10 is a current waveform diagram of current feedback signals of two current feedback input terminals when two primary switches Q1 and Q2 are driven by a pulse width signal of 55% duty cycle in accordance with the prior art.
Figure 11:
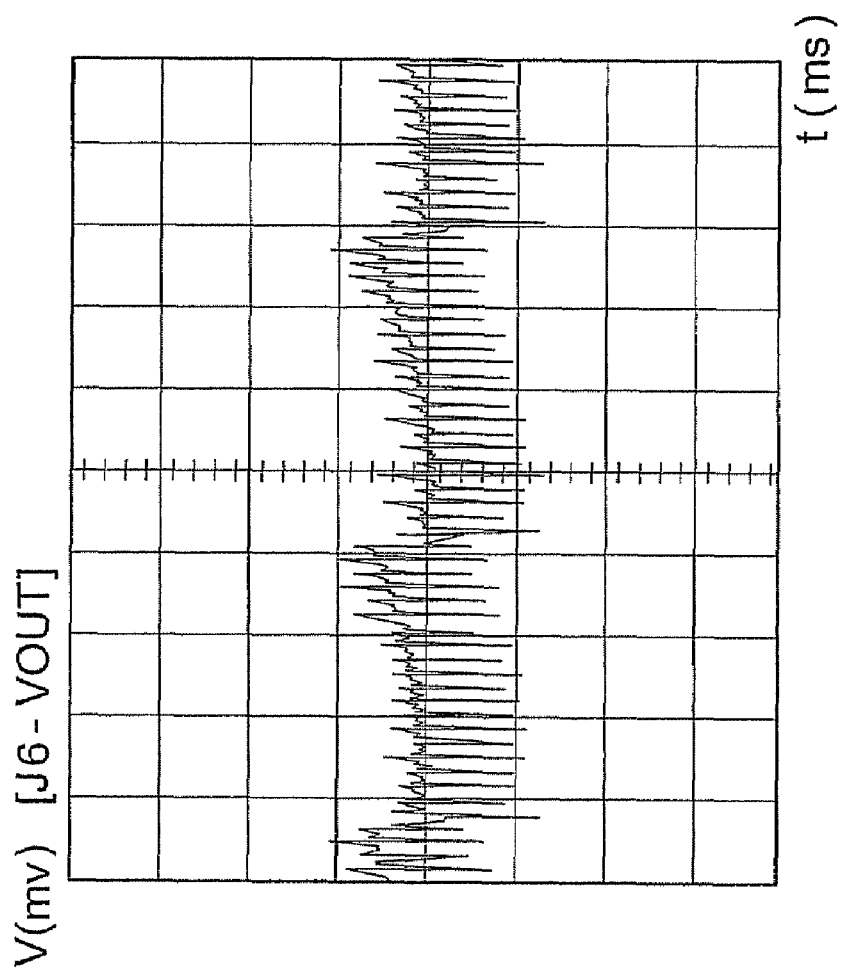
FIG. 11 is a voltage waveform diagram of the power converter circuit of FIG. 8 in accordance with the prior art.

With reference to FIG. 7B, a fifth preferred embodiment of the slope compensation circuit 21d of the present invention is similar to the fourth preferred embodiment. The only difference is that a negative electrode of the first diode 30 is coupled to the second current transformer 29 coupled to the primary side of the second high frequency transformer T2. Similarly, a negative electrode of the second diode 31 is coupled to the first high frequency transformer T1.

The aforesaid electronic switches can be transistors of MOSFET or BJT, so the control terminal is a gate of the MOSFET or a base of the BJT.

It can be understood from the above multiple preferred embodiments that the slope compensation method in accordance with the present invention is as follows.

Firstly, a first and second driving signals respectively synchronized to a switch driving signals of enabling the first primary switch and the second primary switch are acquired. And then two triangular wave signals are generated. The first and second driving signals of the first primary switch and the second primary switch determines a ramp up times of the corresponding triangular wave signals.

Thirdly, the two triangular wave signals are added to one of the output DC voltage feedback signal of the corresponding power converter circuit that are used to compare with the current peak value of the voltage feedback signals. Hence the triangular wave signal forms the high level triangular wave DC voltage feedback signal that is higher than the DC voltage feedback signal. The triangular wave DC voltage feedback signal is inputted to the output voltage feedback signal of the PWM controller. And thereby the PWM controller compares a peak value of the triangular wave DC voltage feedback signal and a corresponding voltage value of the primary side current signal of the first and the second high frequency transformers, so as to generate the first and second switch driving signals of the first and second primary switches.

To sum up, the present invention compensates the slope of the output DC voltage feedback signal to effectively avoid the surge of conductive current signals when the high level triangular wave DC voltage feedback signal compares with successive conductive current signals. Hence the electronic switches of the high frequency transformers are not turned off ahead of the pre determined time due to the surge. Therefore the aforesaid slope compensation method can effectively reduce noises of the alternately conducted electronic switches and also can improve the drawback of the unstable output DC power oscillation.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A slope compensation circuit for a peak current control mode power converter circuit, wherein the peak current control mode power converter circuit has a first forward converter, a second forward converter and a pulse width modulation (PWM) controller for controlling the first and second forward converters, wherein the first forward converter has a first high frequency transformer and a first primary switch serial connected to a primary side of the first high frequency transformer; and the second forward converter has a second high frequency transformer and a second primary switch serial connected to a primary side of the second high frequency transformer, wherein the slope compensation circuit comprises:

a first charging circuit having two resistors to be serial connected to form a first serial connected resistor and a capacitor, wherein two terminals of the first serial connected resistor are respectively coupled to a first terminal of the capacitor and a first DC power source, wherein a second terminal of the capacitor is coupled to a plurality of output voltage feedback terminals of the PWM controller;

a second charging circuit having two resistors to be serial connected to form a second serial connected resistor, wherein the second serial connected resistor is parallel connected to the first serial connected resistor; and a discharging circuit having a third electronic switch coupled to a serial connection node of the first serial connected resistor and having a control terminal coupled to a first driving signal synchronized to a switch driving signal of a control terminal of the first primary switch; and a fourth electronic switch coupled to a serial connection node of the second serial connected resistor and having a control terminal coupled to a second driving signal synchronized to a switch driving signal of a control terminal of the second primary switch, whereby the third electronic switch and the fourth electronic switch simultaneously turned on or off with the first primary switch and the second primary switch.

2. The slope compensation circuit as claimed in claim 1, wherein the control terminal of third electronic switch is coupled to the control terminal of the first primary switch; and the control terminal of the fourth electronic switch is coupled to the control terminal of the second primary switch.

3. The slope compensation circuit as claimed in claim 1, wherein the control terminal of third electronic switch is coupled to the primary side of the first high frequency transformer; and the control terminal of the fourth electronic switch is coupled to the primary side of the second high frequency transformer.

4. The slope compensation circuit as claimed in claim 1, wherein the two resistors of the first serial connected resistor are corresponding equal to the two resistors of the second serial connected resistor.

5. The slope compensation circuit as claimed in claim 2, wherein the two resistors of the first serial connected resistor are corresponding equal to the two resistors of the second serial connected resistor.

6. The slope compensation circuit as claimed in claim 3, wherein the two resistors of the first serial connected resistor are corresponding equal to the two resistors of the second serial connected resistor.

7. The slope compensation circuit as claimed in claim 1, wherein the resistors of the first serial connected resistor and the second serial connected resistor coupled to the capacitor are further parallel connected to a diode.

8. The slope compensation circuit as claimed in claim 2, wherein the resistors of the first serial connected resistor and the second serial connected resistor coupled to the capacitor are further parallel connected to a diode.

9. The slope compensation circuit as claimed in claim 3, wherein the resistors of the first serial connected resistor and the second serial connected resistor coupled to the capacitor are further parallel connected to a diode.

10. The slope compensation circuit as claimed in claim 1, wherein the second terminal of the capacitor is further coupled to one of multiple output DC voltage terminals of the power converter circuit via an optical coupler, wherein an light emitting diode (LED) terminal is coupled to the output DC voltage terminal and a phototransistor is coupled to the capacitor.

11. The slope compensation circuit as claimed in claim 2, wherein the second terminal of the capacitor is further coupled to one of multiple output DC voltage terminals of the power converter circuit via an optical coupler, wherein an light emitting diode (LED) terminal is coupled to the output DC voltage terminal and a phototransistor is coupled to the capacitor.

12. The slope compensation circuit as claimed in claim 3, wherein the second terminal of the capacitor is further coupled to one of multiple output DC voltage terminals of the power converter circuit via an optical coupler, wherein an light emitting diode (LED) terminal is coupled to the output DC voltage terminal and a phototransistor is coupled to the capacitor.

13. A slope compensation circuit for a peak current control mode power converter circuit, wherein the peak current control mode power converter circuit has a first forward converter, a second forward converter and a pulse width modulation (PWM) controller for controlling the first and second forward converters, wherein
   the first forward converter has a first high frequency transformer and a first primary switch serial connected to a primary side of the first high frequency transformer; and
   the second forward converter has a second high frequency transformer and a second primary switch serial connected to a primary side of the second high frequency transformer, wherein the slope compensation circuit comprises:
   a first charging circuit having two resistors to be serial connected to form a first serial connected resistor and a capacitor, wherein two terminals of the first serial connected resistor are respectively coupled to a first terminal of the capacitor and a first DC power source, wherein a second terminal of the capacitor is coupled to one of a plurality of output voltage feedback terminals of the PWM controller;
   a second charging circuit having two resistors to be serial connected to form a second serial connected resistor, wherein the second serial connected resistor is parallel connected to the first serial connected resistor; and
   a discharging circuit having
      a first diode having
         a positive electrode coupled to a serial connection node of the second serial connected resistor; and
         a negative electrode coupled to a first driving signal synchronized to a switch driving signal of a control terminal of the second primary switch;
      a second diode having
         a positive electrode coupled to a serial connection node of the first serial connected resistor; and
         a negative electrode coupled to a second driving signal synchronized to a switch driving signal of a control terminal of the first primary switch.

14. The slope compensation circuit as claimed in claim 13, wherein
   the negative electrode of the first diode is coupled to the control terminal of the second primary switch; and
   the negative electrode of the second diode is coupled to the control terminal of the first primary switch.

15. The slope compensation circuit as claimed in claim 13, wherein
   the negative electrode of the first diode is coupled to a primary side of a second high frequency transformer; and
   the negative electrode of the second diode is coupled to a primary side of a first high frequency transformer.

16. The slope compensation circuit as claimed in claim 13, wherein the two resistors of the first serial connected resistor are corresponding equal to the two resistors of the second serial connected resistor.

17. The slope compensation circuit as claimed in claim 14, wherein the two resistors of the first serial connected resistor are corresponding equal to the two resistors of the second serial connected resistor.

18. The slope compensation circuit as claimed in claim 15, wherein the two resistors of the first serial connected resistor are corresponding equal to the two resistors of the second serial connected resistor.

19. The slope compensation circuit as claimed in claim 13, wherein the resistors of the first serial connected resistor and the second serial connected resistor coupled to the capacitor are further parallel connected to a diode.

20. The slope compensation circuit as claimed in claim 14, wherein the resistors of the first serial connected resistor and the second serial connected resistor coupled to the capacitor are further parallel connected to a diode.

21. The slope compensation circuit as claimed in claim 15, wherein the resistors of the first serial connected resistor and the second serial connected resistor coupled to the capacitor are further parallel connected to a diode.

22. The slope compensation circuit as claimed in claim 13, wherein the second terminal of the capacitor is further coupled to one of multiple output DC voltage terminals of the power converter circuit via an optical coupler, wherein an light emitting diode (LED) terminal is coupled to an output DC voltage terminal and a phototransistor is coupled to the capacitor.

23. The slope compensation circuit as claimed in claim 14, wherein the second terminal of the capacitor is further coupled to one of multiple output DC voltage terminals of the power converter circuit via an optical coupler, wherein an light emitting diode (LED) terminal is coupled to an output DC voltage terminal and a phototransistor is coupled to the capacitor.

24. The slope compensation circuit as claimed in claim 15, wherein the second terminal of the capacitor is further coupled to one of multiple output DC voltage terminals of the power converter circuit via an optical coupler, wherein an light emitting diode (LED) terminal is coupled to an output DC voltage terminal and a phototransistor is coupled to the capacitor.

25. A slope compensation method for a peak current control mode power converter circuit wherein the peak current control mode power converter circuit has a first forward converter, a second forward converter and a pulse width modulation (PWM) controller for controlling the first and second forward converters, wherein
the first forward converter has a first high frequency transformer and a first primary switch serial connected to a primary side of the first high frequency transformer; and
the second forward converter has a second high frequency transformer and a second primary switch serial connected to a primary side of the second high frequency transformer; wherein
the slope compensation method comprises:
acquiring a first and second driving signal respectively synchronized to a first and second switch driving signals of enabling the first primary switch and the second primary switch;
generating two triangular wave signal wherein the first and second switch driving signals of the first primary switch and the second primary switch determines a ramp up times of the corresponding triangular wave signals; and
adding the two triangular wave signals to one of the output DC voltage feedback signal of the corresponding power converter circuit that are used to compare with a current peak value of the voltage feedback signals, so as to form a high level triangular wave DC voltage feedback signal that is higher than the DC voltage feedback signal, wherein the triangular wave DC voltage feedback signal is inputted to the output voltage feedback signal of the PWM controller, wherein the PWM controller compares the peak value of the triangular wave DC voltage feedback signal and a corresponding voltage value of the primary side current signal of the first and the second high frequency transformers, so as to generate the first and second switch driving signals of the first and second primary switches.

26. The slope compensation method as claimed in claim 25, wherein the synchronous signal is acquired from a driven terminal of the first primary switch and the second primary switch.

27. The slope compensation method as claimed in claim 25, wherein the synchronous signal is acquired from a driven signal of the first primary switch and the second primary switch, which is generated from the current transformer coupled to the primary side of the two high frequency transformers.

* * * * *